United States Patent [19]

Prochaska et al.

[11] Patent Number: 4,671,842
[45] Date of Patent: Jun. 9, 1987

[54] SYSTEM FOR THE MANUFACTURE OF TUBULAR STRUCTURAL PARTS OF A FIBER-REINFORCED PLASTIC

[75] Inventors: Wolfgang Prochaska, Munich; Ralf T. Schulz, Putzbrunn; Peter M. Wackerle, Ottobrunn, all of Fed. Rep. of Germany

[73] Assignee: Messerschmitt-Boelkow-Blohm GmbH, Munich, Fed. Rep. of Germany

[21] Appl. No.: 680,696

[22] Filed: Dec. 12, 1984

[30] Foreign Application Priority Data

Dec. 13, 1983 [DE] Fed. Rep. of Germany ....... 3344996

[51] Int. Cl.$^4$ .............................................. B29C 7/00
[52] U.S. Cl. .................................... 156/425; 156/443; 156/446; 156/458; 425/438
[58] Field of Search ......................... 156/443, 446–450, 156/456–458, 184–185, 187–188, 195, 190–192, 344, 171, 172–173, 175, 169; 425/438; 493/298–302

[56] References Cited

U.S. PATENT DOCUMENTS

| | | | |
|---|---|---|---|
| 3,031,361 | 4/1962 | Strickland | 156/175 X |
| 3,121,253 | 2/1964 | Varrial | 156/450 X |
| 3,256,503 | 6/1966 | Bristol et al. | 156/449 |
| 3,549,456 | 12/1970 | Stephens et al. | 156/446 |
| 3,730,795 | 5/1973 | Medney et al. | 156/446 X |
| 4,080,142 | 3/1978 | Moore | 425/438 |
| 4,153,498 | 5/1979 | Bichot et al. | 156/446 |
| 4,309,232 | 1/1982 | McIntosh | 156/344 X |

Primary Examiner—David Simmons
Attorney, Agent, or Firm—Flynn, Thiel, Boutell & Tanis

[57] ABSTRACT

A system for the automatic manufacture of pipe-shaped or tubular structural parts of a fiber-reinforced plastic. A device is provided with which fiber strands are soaked with a heat-hardenable binding agent. The device has the capability of clamping at least one winding mandrel into a winding machine, on which mandrel can be placed the soaked fiber strands. The winding machine has a guiding mechanism for the fiber strand which is to be wound onto the mandrel, which guiding mechanism can be moved back and forth parallel with respect to the mandrel. A transporting mechanism is provided for moving the wound structural parts through a hardening furnace to a device for extracting the winding mandrels from the hardened structural parts and to at least one finish-working station. The extracted and now empty winding mandrels are returned through a mandrel preparation station to the winding station. The finish-working station is provided between the hardening furnace and the mandrel extracting device. Through the aforesaid structure, pipe-shaped or tubular structural parts of any desired shape can be manufactured.

31 Claims, 10 Drawing Figures

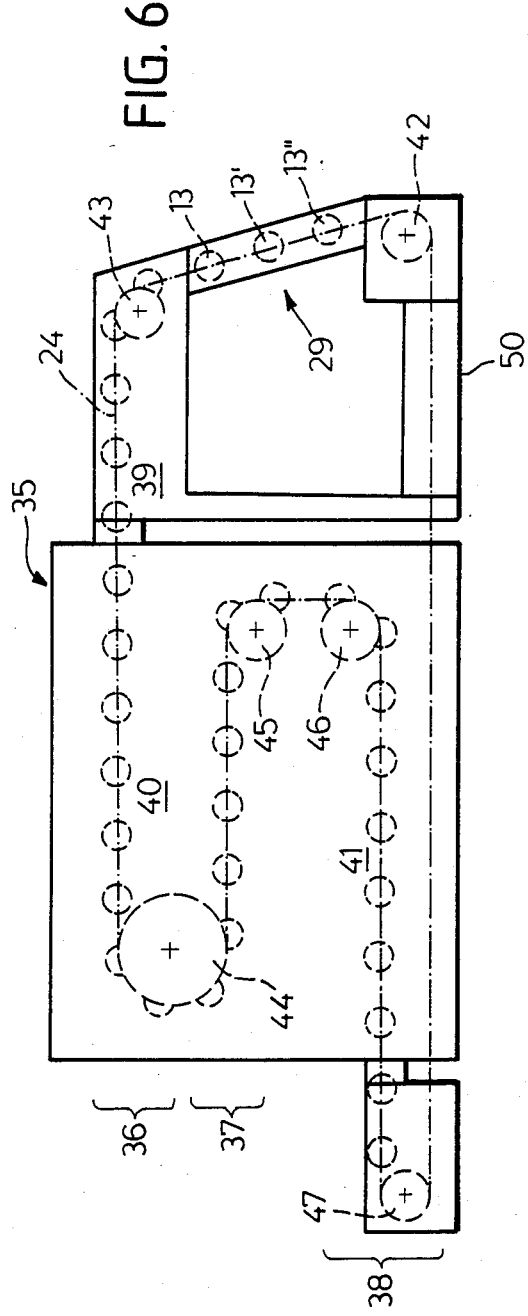
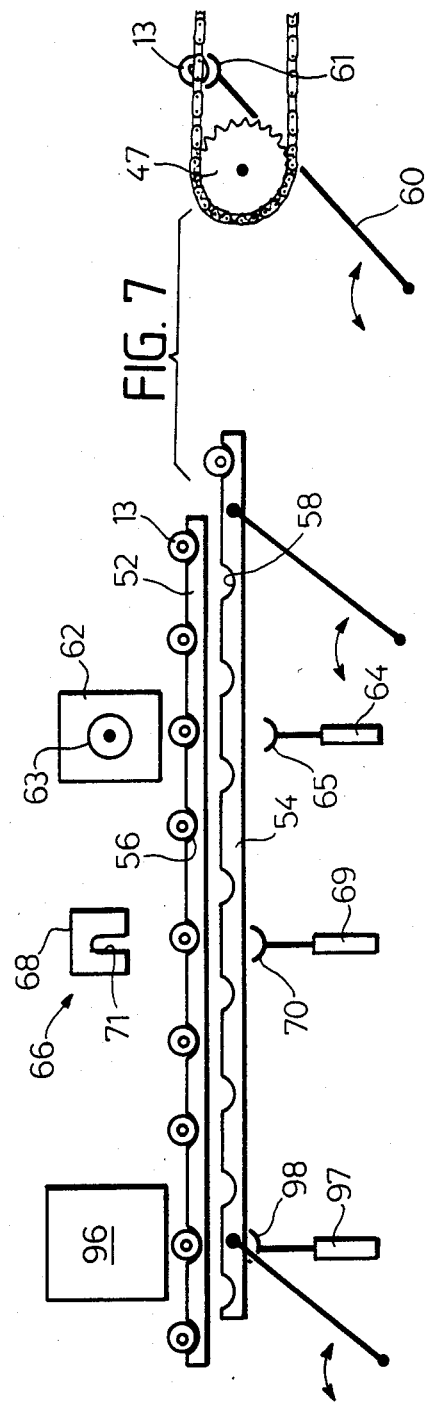

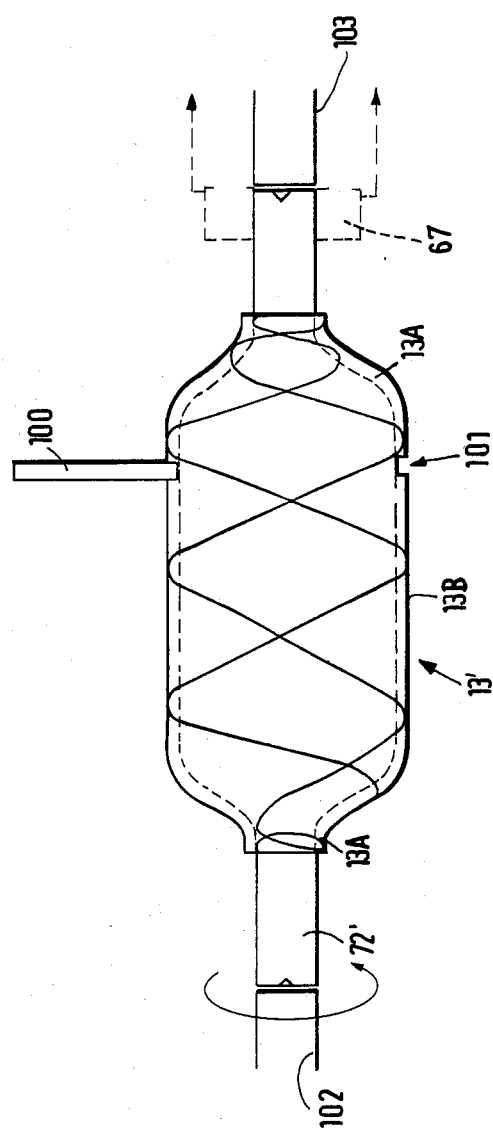

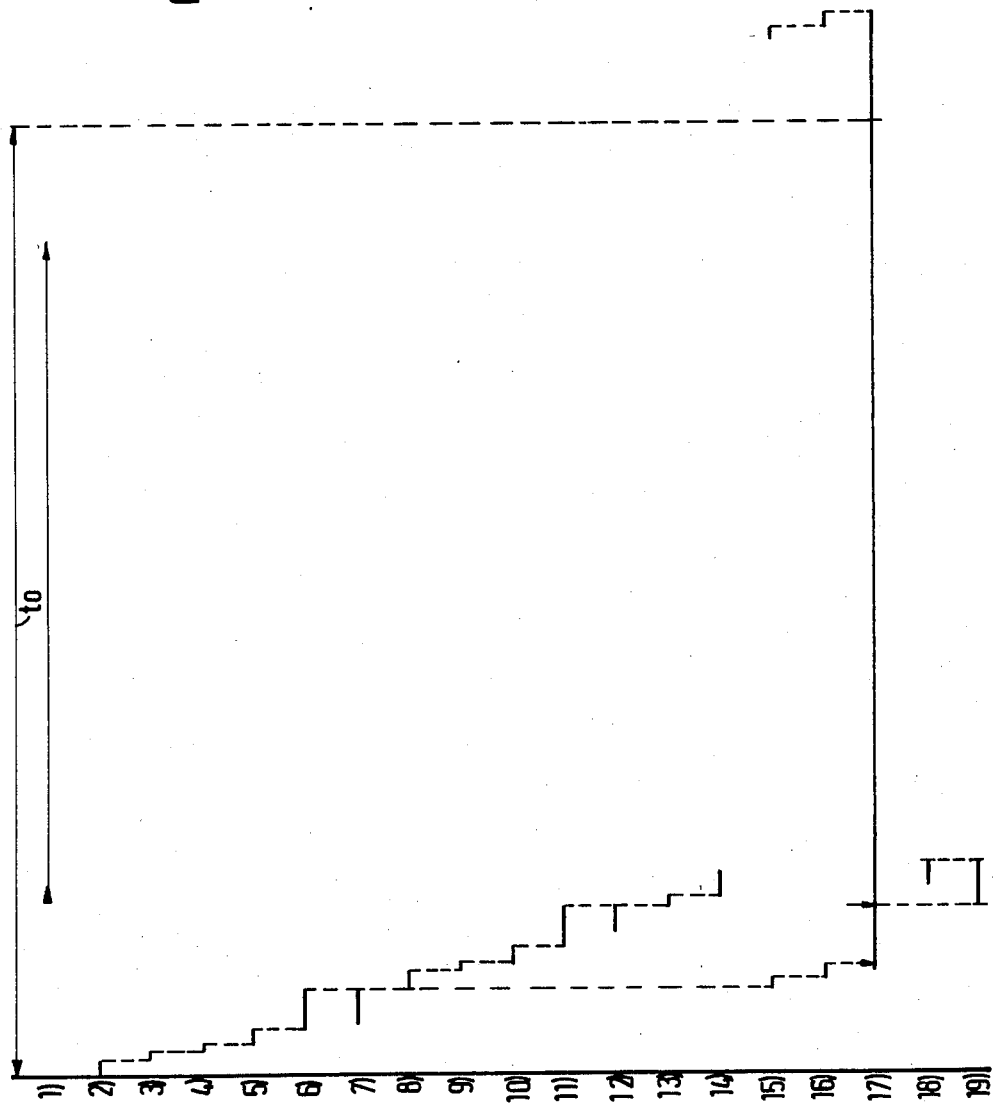

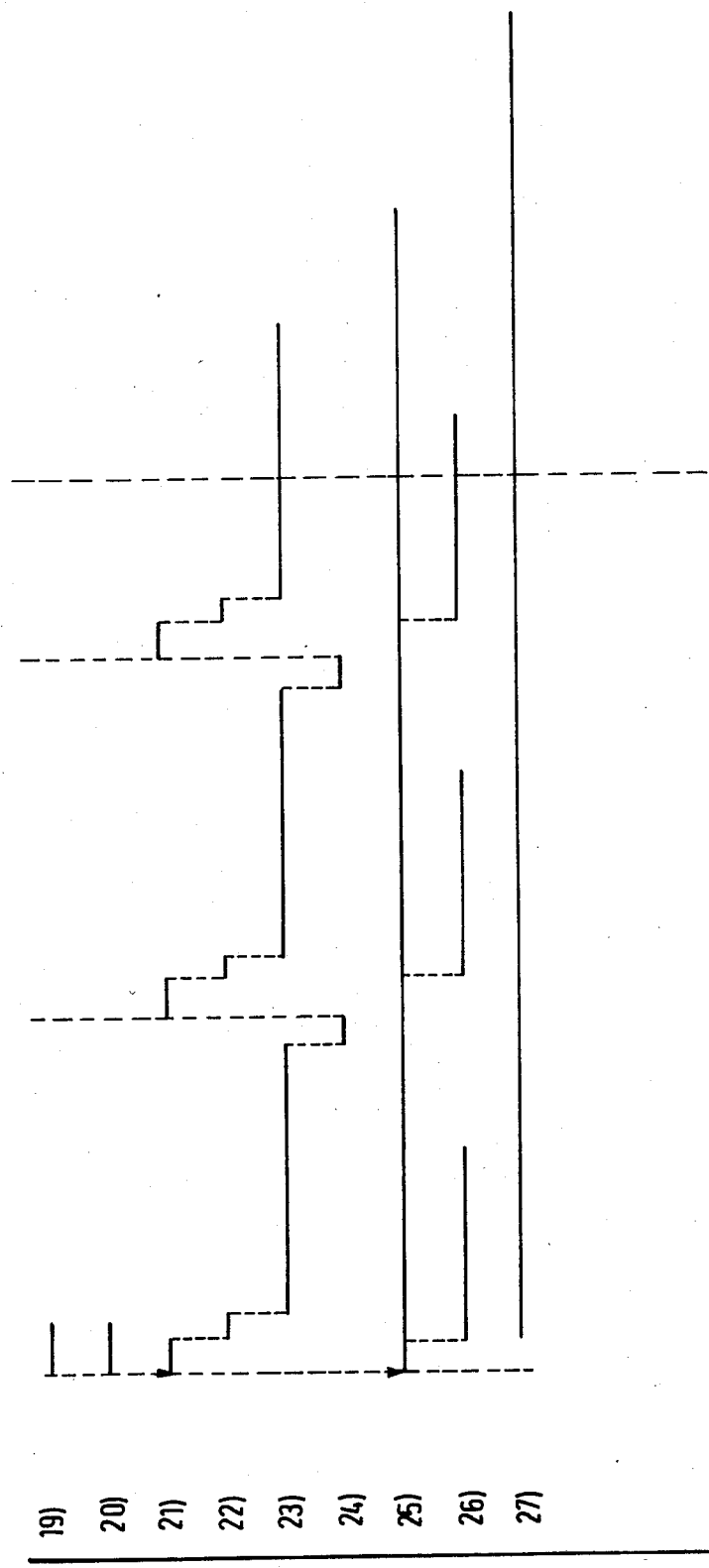

SYSTEM FOR THE MANUFACTURE OF TUBULAR STRUCTURAL PARTS OF A FIBER-REINFORCED PLASTIC

FIELD OF THE INVENTION

The invention relates to a system for the manufacture of pipe-shaped or tubular structural parts out of a fiber-reinforced plastic including a device in which fiber strands are soaked with a heat-hardenable binding agent, which device includes at least one winding mandrel which can be clamped into a winding machine, onto which winding mandrel the soaked fiber strands are wound, the winding machine having a guiding mechanism for the fiber strand which is to be wound onto the mandrel, which guiding mechanism can be moved back and forth parallel with respect to the mandrel axis, and a transporting mechanism with which the wound structural parts are moved through a hardening furnace to a device for pulling out or extracting the winding mandrels from the now hardened structural parts and delivering them to at least one finish-working station, the now empty winding mandrels being returned through a mandrel-preparing station to the winding station for reuse.

BACKGROUND OF THE INVENTION

Such an automatic system is already known (Modern Plastics Encyclopedia, 1982–1983, Page 363). Since the mandrel is extracted from the hardened structural part directly after leaving the furnace, it is, however, only possible to manufacture, with the conventional system, structural parts having a very specific winding structure, namely a winding structure having a uniform inside diameter. A finish-working of the structural part is intended in the conventional system after the mandrel has been extracted.

It is known from German OS No. 25 24 853 to accelerate the winding of light masts of fiber-reinforced plastic by providing a winding machine with several winding mandrels arranged parallel to one another.

British Pat. No. 1 478 231 discloses a substantially automated system for the manufacture of pipe-shaped or tubular structural parts. Felt-strip sections which are soaked with a binding agent are thereby fed to a winding mandrel, which mandrel is heated up in order to harden the inside of the structural part during the winding operation. After the winding is done, several pressure rollers arranged around the structural part hold the structural part in position while the winding mandrel is extracted from the structural part. Through the hardened inside, the structural part temporarily maintains its form and is then fed to a furnace to complete the hardening process and thence to the finish-working devices. The transport through the furnace, which has several levels, occurs thereby through crossbeams which move wavelike up and down in the conveying direction, so that the structural parts rotate at the same time. The structural parts drop thereby from one level to the other level. However, it is not possible to manufacture structural parts having wound fiber strands thereon with the conventional system.

The basic purpose of the invention is to provide an automatic system having a high performance characteristic to facilitate the manufacture of pipe-shaped or tubular structural parts of any desired winding structure.

The invention will be described exemplarily hereinbelow with reference to the accompanying drawings, in which:

FIG. 6 is a side view of a furnace with the device for facilitating the transport of the structural parts through the furnace;

FIG. 7 is a side view of a part of the rocker-bar conveyor arranged following the device for facilitating the transport of the structural parts through the furnace;

FIG. 8 illustrates a structural part which does not have a uniform diameter, following a hardening in the finish-working station; and FIGS. 9A and B each illustrate a timing or sequencing diagram for the system.

DETAILED DESCRIPTION

Figure 1:
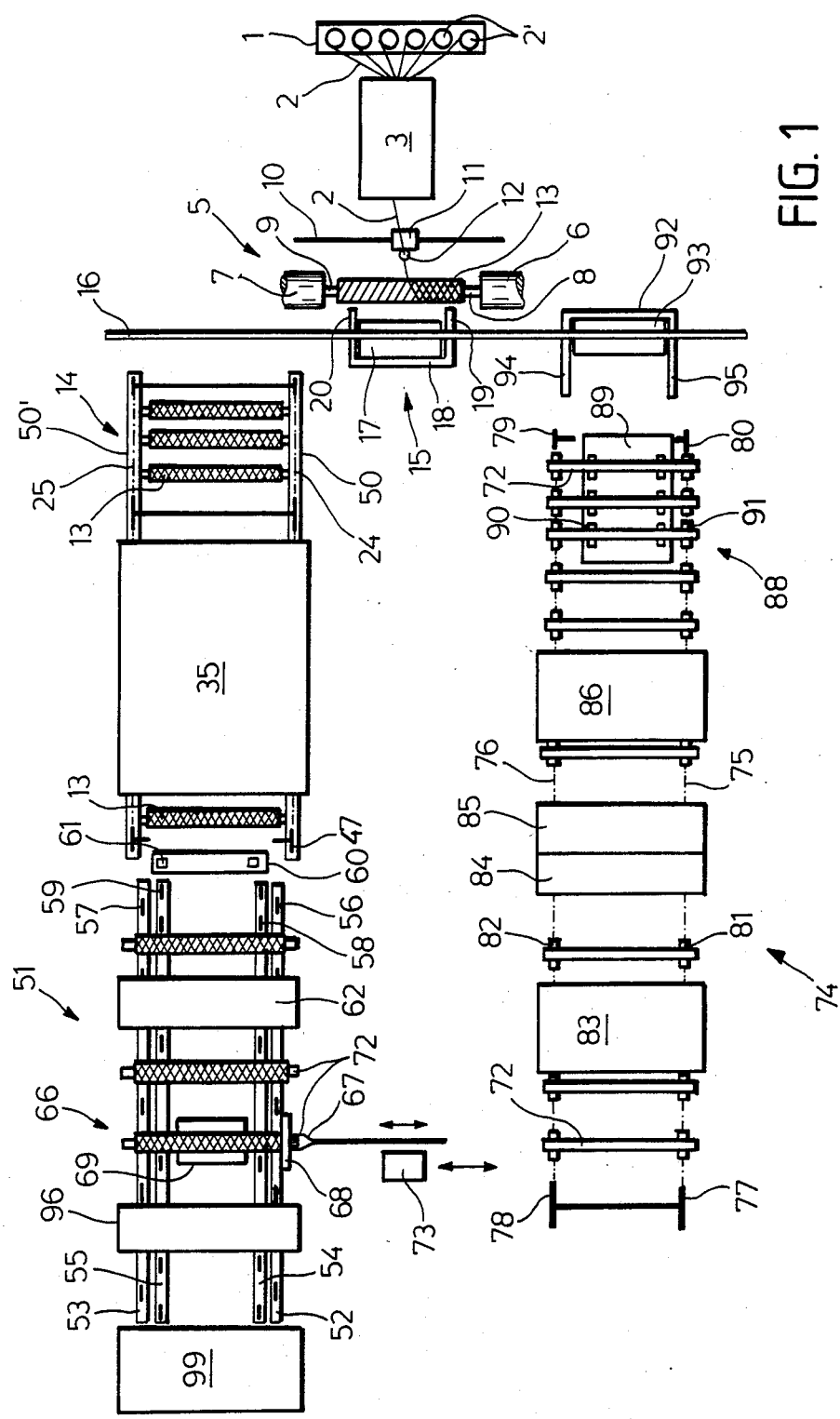
FIG. 1 is a top view of an embodiment of the inventive system.

The system has, according to FIG. 1, a frame 1 on which the fiber-strand storage spools 2' are arranged. The fiber strands 2, for example glass/fiber strands, extend from the storage spools 2' to a soaking device 3 in which they are soaked with a heat-hardenable binding agent. The soaked fiber strands 2 are then fed to the winding machine 5.

Figure 2:
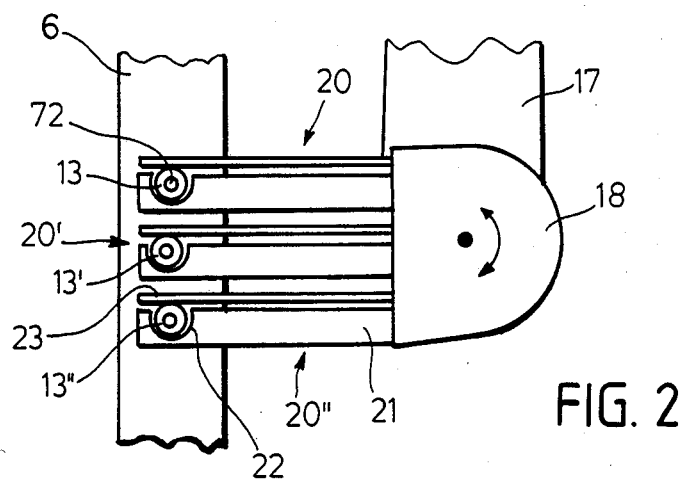
FIG. 2 is a side view of a part of the transfer device arranged on the winding machine to facilitate the transfer of the wound structural parts from the winding machine to the device for transporting the structural parts through the furnace.
Figure 3:
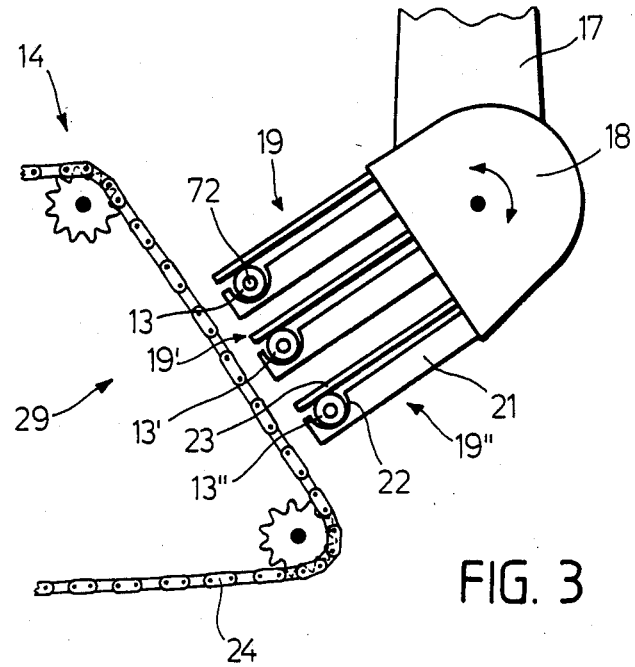
FIG. 3 is a side view of a part of the transfer device according to FIG. 2, however, in a position on the device for facilitating the transport of the structural parts through the furnace.

The winding machine 5 is structured to facilitate the simultaneous winding of three structural parts 13, 13' and 13" (see FIGS. 2 and 3). It has for this purpose a frame with parts 6 and 7 in which the ends of the winding mandrel are rotatably supported, namely by a work spindle 8 in one end and an axially movable clamping spindle 9 in the other end. A winding mandrel 72 is adapted to be clamped between the work spindle 8 and the clamping spindle 9. The axes of rotation of the work/clamping spindle pairs 8 and 9 extend horizontally and parallel to one another. Each clamped-in winding mandrel is thereby fixedly connected against rotation relative to the associated work spindle 8, preferably by Hirth-type serrations, while on each clamping spindle 9 there is provided a (not illustrated) centering tip which is received in a corresponding conical centering bore at the end of the respective winding mandrel.

To guide the fiber strands 2 which are to be wound onto the winding mandrels, an elongate rail 10 is provided which extends parallel with respect to the winding mandrels and is arranged on the front side of the winding machine 5. A carriage 11 is supported on the rail 10 for back-and-forth movement. The carriage 11 has a thread guide 12 thereon.

At a specific rotative speed of the winding mandrels are clamped in the winding machine 5, it is possible to adjust in this manner through the speed of the back-andforth movement of the carriage 11, the winding angle of the fiber strands relative to the longitudinal axis of the mandrel 72.

The wound structural parts 13, 13', 13" (FIGS. 2 and 3) are subsequently together with the winding mandrel fed to a mechanism 14 whereat they are transported thereby through a furnace 35 to effect a hardening of the resin. The transfer device 15, with which the structural parts 13, 13', 13" are fed from the winding machine 5 to the furnace transporting mechanism 14, is aside from in FIG. 1 illustrated partially in FIGS. 2 and 3. It has a horizontally extending carriage support 16 secured to the ceiling and extends from the backside of the winding machine 5 laterally to the front of the furnace transporting mechanism 14. Suspended from the support 16 is a carriage 17 on which is provided a frame 18. The carriage 17 is mounted for movement along the length of the support 16. The frame 18 is supported for rotatable movement about a horizontal axis extending parallel with respect to the longitudinal axis of the support 16 and with respect to the axis of rotation of the structural part being formed on the winding machine 5.

Two gripping devices 19, 19' and 19" (FIG. 3) and 20, 20' and 20" (FIG. 2) are spaced from one another and are each arranged on the frame 18 for, in the present case three, structural parts 13, 13' and 13" which are simultaneously clamped on the winding machine 5. Each gripping device 19, 19', 19" and 20, 20' and 20" consists of a rail 21 having a recess 22 on its upper side, which recess 22 grips under the respective structural part 13, 13' or 13". They each also consist of a lock 23 which is movably guided parallel to the longitudinal axis of each rail 21 and which is movable over the structural part 13, 13' or 13" arranged in the recess 22 of the rail 21. In this manner, it is possible for each structural part 13, 13' and 13" to be gripped by each of the two gripping devices 19, 19' or 19" and 20, 20' or 20".

After releasing the structural parts 13, 13' and 13" by an axial movement of the associated clamping spindle 9, the structural parts 13, 13' and 13" around which grip the gripping devices 19, 19' and 19" and 20, 20' and 20" are swung out of the winding machine 5 caused by a suitable rotation of the frame 18 out of the position which is illustrated in FIG. 2 and are moved by means of the carriage 17 laterally to a position in front of the furnace transporting mechanism 14, whereat they are swung by the gripping devices 19, 19' and 19" and 20, 20' and 20" into the position which is illustrated in FIG. 3 and are then delivered to the furnace transporting mechanism 14, as will be discussed in greater detail hereinbelow.

The furnace transporting mechanism 14 is formed by a two-strand chain conveyor, which is step driven. Each of the two conveyor chains 24 and 25 (FIG. 5) of the chain conveyor is provided on the opposing inner sides thereof with receiving means 26 and 27 for the end sections of the structural parts 13. This means that the distance between the opposing receiving means 26 and 27 is slightly greater than the length of the winding mandrels or structural parts 13.

The opposing receiving means 26 and 27 for receiving a winding mandrel therein are each arranged in a horizontal plane. The distance between the receiving means 26 and 27 in the conveying direction of the chains corresponds thereby with the length of the path through which the conveyor chains 24 and 25 are stepped during the step driving thereof.

Figure 4:
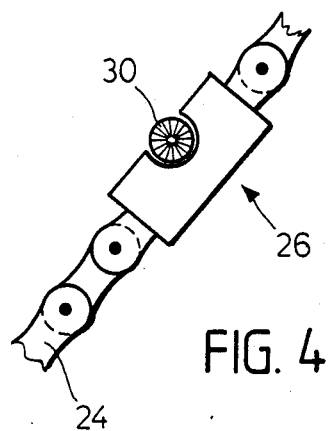
FIG. 4 is an enlarged side view of a part of the conveyor chain of the device for facilitating the transport of the structural parts through the furnace.
Figure 5:
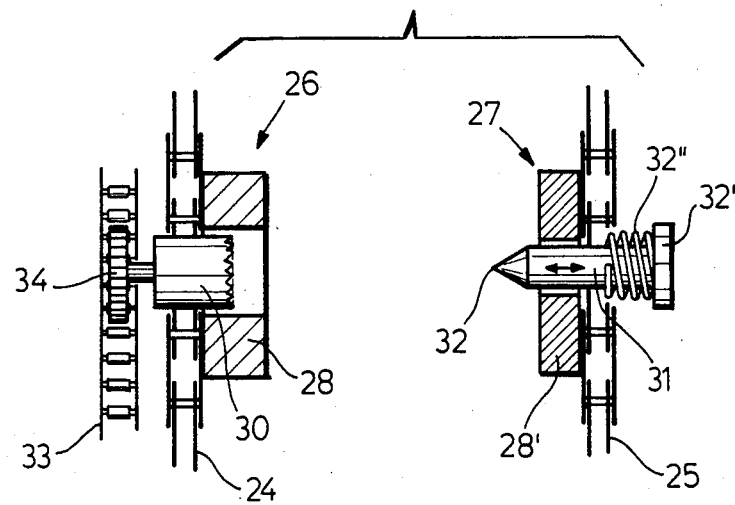
FIG. 5 is a cross section of two opposed sections of the two conveyor chains of the device for facilitating the transport of the structural parts through the furnace in an enlarged illustration.

As can be taken from FIGS. 4 and 5, each receiving means 26 and 27 can include a block 28 or 28' which is secured to the inner sides of the conveyor chains 24 and 25. Each block 28 or 28' has an upwardly open recess.

The structural parts 13, 13' and 13" roll, following an unlocking effected by moving the lock 23 back out of the blocking relation with the recesses 22 of the gripping devices 19, 19' and 19" and 20, 20' and 20", into the recesses of the receiving means 26 and 27. The section 29 of the chain conveyor extends for this purpose, inclined to the vertical extending from a position below the winding machine upwardly away from the winding machine 5, while the longitudinal axis of the rails 21 of the gripping members 19 and 20 take on a position or orientation which is perpendicular with respect to the inclined section 29.

In order that no binding agent can drip during the transport of the structural parts 13 into the furnace, the furnace transporting mechanism 14 has a device causing the structural parts 13 to be rotated (FIGS. 4 and 5).

This device consists of a drive spindle 30 and an axially movable clamping spindle 31 which are each arranged on opposed receiving means 26 and 27 of the two conveyor chains 24 and 25 and are supported in the respective conveyor chain 24 or 25 and the blocks 28 or 28' thereof.

The winding mandrels 72 of the structural parts 13, 13' and 13" which are mounted on or received in the receiving means 26 and 27 along with the gripping members 19, 19' and 19" and 20, 20' and 20" can in this manner be fixedly connected to and rotatable with the drive spindle 30, namely again preferably through Hirth-type serrations. The clamping spindle 31 with its centering tip 32 is received in the aforementioned conical centering bore at the end of the respective winding mandrel. As a result, a sliding of the structural parts 13 in the receiving means 26 and 27 and thus an occurrence of sliding surfaces on the outer peripheral surface at the ends of the structural parts 13 is prevented.

The clamping spindle 31 has at the end thereof remote from the centering tip 32 and which projects from the chain 35 an enlarged head 32'. Furthermore, a tension spring 32" is provided with one end thereof bearing against the head 32' and the other end on the chain. Thus, the clamping spindle 31 is spring-loaded toward the drive spindle 30. In order that at the point at which the structural parts 13, 13' and 13" are released by the gripping devices 19, 19' and 19", the structural parts 13, 13' and 13" can roll into the recesses of the receiving means 26 and 27 or the blocks 28 and 28". However, prior to this the clamping spindle 31 must be pulled out of the recess. A not illustrated, pneumatically operable device is, for this purpose, provided at this point of the furnace transporting mechanism and engages the head 32' and pulls the clamping spindle against the force of the spring 32" into the block 28'.

The drive spindles 30 are driven by a roller chain 33 which is oriented adjacent to the conveyor chain 24, namely through a coaxial pinion which is fixedly connected to and rotatable with the drive spindle 30 (FIG. 5).

The structural parts 13, 13' and 13" are moved upwardly with the sloped section 29 of the chain conveyor to the uppermost level 36 of a three level furnace 35 having three levels 36, 37 and 38. The binding agent is hardened in the furnace 35 (FIG. 6).

The prewarming zone 39 is therefore provided in the uppermost level 36. The main warming zone 40 includes the uppermost level 36 and the center level 37 and follows the prewarming zone 39. The cooling zone 41 is provided in the lowermost level 38.

The structural parts are quickly heated up in the prewarming zone 39, which for example is composed of an IR or electric heater. The main heating zone 40 is provided by an air-circulating furnace. In order that no solvent vapors can occur, a not illustrated suction device is connected to the furnace 35 which creates a slight overpressure in the furnace 35. In order that the duration in the main heating zone 40 is as long as possible and yet to conserve space usage, the cooling zone 41 is arranged below the main heating zone 40 and the chain conveyor is guided over a S-shaped route in the furnace 35 so that, and as is illustrated in FIG. 6, the structural parts 13, 13' and 13" with their winding mandrels are clamped between the drive spindles 30 and the clamping spindles 31 and moved twice through almost the full length of the main heating zone 40.

The conveyor chains 24 and 25 are for this purpose guided over plural pairs of sprockets located in the furnace 35. More specifically, a first sprocket pair 42 is located at the front end of the inclined section 29 to the furnace 35, thus at the level of the lowermost level 38. A second sprocket pair 43 is located at the end of the inclined section 29, thus at the level of the uppermost level 36 in front of the prewarming zone 39 above and offset toward the furnace from the first sprocket pair 42. A third sprocket pair 44 is located in the uppermost level 36 at the rear region of the main heating zone 40. A fourth sprocket pair 45 is located in the center level 37 in the front region of the main heating zone 40. A fifth sprocket pair 46 is located in the cooling zone 41 below the fourth sprocket pair 45 and a sixth sprocket pair 47 is arranged outside of the furnace 35 at the level of the lowermost level 38.

The sprockets of at least one of the sprocket pairs 42 to 47 are connected to one another with no relative movement capability therebetween, for example, by means of a shaft and the axes of rotation of the sprocket pairs 42 to 47 extend horizontally and parallel to one another.

In order that the system can be adjusted to the length of the structural parts 13 which are to be manufactured, the sprockets of the sprocket pairs 42 to 47 are axially movable with respect to one another. The sprockets of the sprocket pairs 42 to 47, around which travels, for example, the conveyor chain 24, can for this purpose be supported on a frame 50 (FIG. 1) which is movable relative to the frame 50'. The frame 50' has the sprockets thereon over which the other conveyor chain 25 travels.

The furnace transporting mechanism 14 or the chain conveyor 24, 25 is followed by an oscillating bar conveyor mechanism 51. The oscillating bar conveyor 51 has two stationary bars 52 and 53 oriented laterally outside of two oscillating bars 54 and 55. The stationary bars 52 and 53 and the oscillating or movable bars 54 and 55 are each provided on their upper side with receiving means or pockets 56 and 57 or 58 and 59 for receiving the structural parts thereon.

The distance between the receiving means 56 and 57 of the stationary bars 52 and 53 and the distance between the receiving means 58 and 59 of the movable bars 54 and 55 correspond with the distance through which the movable bars 54 and 55 move forwardly per stroke. The transport of the structural parts 13 by the oscillating bar conveyor 51 is thus accomplished by the structural parts 13 which lie in the receiving means 56 and 57 of the stationary bars 52 and 53 being gripped on the underside thereof by the receiving means 58 and 59 in the movable bars 54 and 55, the receiving means 58 and 59 on the movable bars 54 and 55 lifting the structural parts up and placing them into the next set of receiving means 56 and 57 to the left (FIGS. 1 and 7) on the stationary bars 52 and 53.

A not illustrated pneumatically operable device is provided adjacent the left end of the oscillating bar conveyor 51, with which device the clamping spindles 41 (FIG. 5) are retracted, so that the structural parts 13 will lie loosely in the receiving means 26 and 27 of the conveyor chains 24 and 25.

The transfer of the structural parts 13 from the furnace transporting mechanism or chain conveyor 14 is accomplished by providing an elongate bar 60 having receiving means 61 thereon. The bar 60 grips with its receiving means 61 under the structural part 13 located at the left end of the chain conveyor reaches, lifts it out of the corresponding receiving means 26 and 27 and places the structural part 13, after it has been pivoted accordingly about the axis of the pivot support 60A, into the adjacent receiving means 56 and 57 in the stationary bars 52 and 53 of the oscillating bar conveyor 51.

The bar 60 can be operated by a contact of a limit or proximity switch, a photocell or the like, which becomes activated if a structural part 13 approaches the point on the chain conveyor whereat the bar 60 engages the structural part 13.

The structural parts 13 are sequentially moved by the oscillating bar conveyor 51 to a grinding device 62. The peripheral surface of the structural parts 13, if desired only certain peripheral surface sections thereof, for example the end sections of the structural parts 13, is ground by the grinding device 62 in order to be able to mount any type of connecting parts thereon.

The grinding device 62 has for this purpose a device (not shown) for effecting a clamping or gripping of the winding mandrels on the structural parts 13 and a grinding disk 63 which is movable radially toward the gripped structural part 13 and transversely with respect to the oscillating bar conveyor 51 along the length of the structural part 13.

The grinding device 62 is arranged above the oscillating bar conveyor 51. The transport mechanism for shifting the structural parts 13 upwardly from the receiving means 56 and 57 on the stationary bars 52 and 53 to the grinding device 62 includes a lifting table 64 (FIGS. 1 and 7) having receiving means thereon for the respective structural part 13 and is arranged between the movable bars 54 and 55.

The next station on the oscillating bar conveyor 51 following the grinding device 62 is a device 66 with which the winding mandrels are extracted from the structural parts 13.

The winding mandrel extracting device 66 includes a gripping mechanism 67 (FIG. 1) and a stop 68. The stop 68 is arranged above the bar conveyor 51. A lifting table 69 with receiving means 70 thereon is arranged on the winding mandrel extracting device 66. The lifting table 69 is constructed in the same manner as the lifting table 64 associated with the grinding device 62 and which is discussed in greater detail hereinabove.

The stop 68 (FIG. 7) consists of a plate having a downwardly opening recess 71 therein. The recess 71 has a width which is only slightly larger than the outside diameter of the winding mandrel 72. Furthermore, the stop 68 is oriented with respect to the oscillating bar conveyor 51 or the lifting table 69 such that the lifting table 69 moves the structural part 13 so that one end of the winding mandrel 72 is received into the recess 71 of the stop 68. The winding mandrels 72 are, as indicated in FIG. 1, not completely covered during winding but project from the two ends of the structural part 13. The one end of the winding mandrel 72 which is moved into the recess 71 projects axially beyond the opposite side of the stop 68.

The gripping mechanism 67, which is preferably constructed as a chuck and is movable back and forth transversely with respect to the longitudinal axis of the oscillating bar conveyor mechanism, now grips the end of the winding mandrel 72 which projects from the stop 68, and pulls same out of the structural part 13, the structural part being held against a following movement by the stop 68 (FIG. 1).

In a path oriented above the path of movement of the gripping mechanism 67 there is arranged a further not illustrated gripping mechanism on a lifting cylinder 73. The gripping mechanism on the lifting cylinder 73 grips the winding mandrel 72 which has been pulled out of the structural part 13 by the gripping mechanism 67, after which it is moved upwardly with the lifting cylinder 73 and then to the device 74 for the return transport of the winding mandrels 72 to the winding machine 5.

The winding mandrel return transport device 74 is constructed as a two-strand, step driven chain conveyor. It extends parallel with respect to the furnace transporting mechanism 14 and with respect to the oscillating bar conveyor 51.

The two conveyor chains 75 and 76 of the chain conveyor are guided by sprocket pairs 77, 78 and 79, 80 at the opposite ends of the chain conveyor, namely adjacent the winding mandrel extracting device 66 at one end and adjacent the winding machine 5 at the other end. The sprocket pairs 77, 78 and 79, 80 are connected to one another so as to prevent relative rotation therebetween, for example, by shafts. Further, the axes of rotation of the sprocket pairs 77, 78 and 79, 80 extend horizontally and parallel to one another.

Each conveyor chain 75 and 76 of the winding mandrel return transport device 74, constructed as aforesaid as a chain conveyor, is provided with receiving means 81 or 82 thereon. The distances between the receiving means 81 or 82 in the conveying direction correspond to the distance through which the chain conveyor moves per stroke.

The winding mandrels 72 are carried to and placed in the receiving means 81 and 82 by the gripping mechanism which is arranged on the lifting cylinder 73.

At the point at which the gripping mechanism, arranged on the lifting cylinder 73, places the winding mandrels 72 into the receiving means 81 or 82, a device 83 next follows in conveying direction for effecting a cleaning of the winding mandrels, for example, from hardened binding agent residues.

In the case of the cleaning device 83, for example, rotating brushes are incorporated therein.

The winding mandrels then exit the cleaning device 83 and travel to a device 84 for applying a parting compound onto the winding mandrels 72. The parting compound serves to effect a better release of the winding mandrels 72 from the structural parts 13 at the winding mandrel extracting device 66. The parting compound can be a wax or a waxlike product.

To apply the parting compound onto the winding mandrels a roller (not illustrated) is provided and has an absorbent, soft surface, to which roller is fed a parting-compound solution. The roller is rolled along the length of the winding mandrels 72.

The winding mandrels then travel to a device 85 for removing (sucking away) the solvent of the parting compound solution from the winding mandrels.

The winding mandrels then travel to a device 86 for polishing the winding mandrels 72. The polishing device 86 can, for example, have a rotating felt disk (not illustrated).

The cleaning device 83, the parting compound application device 84, the solvent removing device 85 and the polishing device 86 are arranged above the winding mandrel return transport device 74 for moving the winding mandrels from the receiving means 81 and 82 on the conveyor chains 75 and 76 of the chain conveyor to the devices 83 to 86, a lifting table (not illustrated) with receiving means for the winding mandrels thereon is provided, and the lifting table corresponds in construction to the lifting table 64 in the grinding device 62 positioned on the oscillating bar conveyor 51 and can be arranged between the conveyor chains 75 and 76.

A device 88 for effecting the transfer of the winding mandrels 72 from the winding mandrel return transport device 74 to the winding machine 5 is oriented adjacent the right end of the winding mandrel return transport device 74.

The transfer device 88 includes a bar 89 having receiving means 90 and 91 thereon for receiving the winding mandrels 72 therein. Gripping mechanisms 94 and 95 are arranged on a frame 92 which is hingedly supported on a carriage 93.

The carriage 93 is movable on the carriage support, for example, the aforementioned carriage support 16, between the bar 89 and the winding machine 5. The carriage support 16 extends thus from the front of the furnace 35 and conveyor 14 therefor on one side of the winding machine 5 to the bar 89 on the opposite side of the winding machine. The remainder of the construction and the arrangement of the gripping mechanisms 94 and 95 on the carriage 93 is the same as described above in connection with the gripping mechanism 19 and 20 and the carriage 17 of the device 15 for effecting the transfer of the structural parts from the winding machine 5 to the furnace transporting device 14. Only the receiving means on the gripping mechanisms 94 are adjusted to the diameter of the winding mandrels 72.

The gripping mechanisms 94 and 95 are pivoted with the winding mandrels 72 thereon about a horizontal axis extending in the longitudinal direction of the carriage support 16 and moved lengthwise of the carriage support 16 from the side which faces the bar 89 to the side of the carriage support 16 which faces the winding machine 5. This movement results in a placement of the winding mandrels 72 between the work spindles 8 and the clamping spindles 9 on the winding machine.

The bar 89 is pivotal about a horizontal axis which extends transversely with respect to the longitudinal axis of the chain conveyor 74 outwardly therefrom. It has a receiving means thereon for as many winding mandrels as there are receiving means on the gripping mechanisms 94 and 95 of the carriage, thus for example receiving means for three winding mandrels 72. This means that the number of the receiving means on the bar 89 is adjusted to the number of the structural parts 13, 13' and 13", which can be wound simultaneously by the winding machine 5.

After extracting the winding mandrels 72 out of the structural parts 13, the structural parts are fed by the oscillating bar conveyor 51 to a further finish-working device, for example to the finish-working device 96. The finish-working device 96 includes a milling tool for cutting slots and other recesses into the structural part. If the structural part which is being manufactured is for use as a steering column, then it is possible to cut with the milling tool a longitudinal slot into the steering column for the purpose of receiving therein a locking bolt of the steering wheel locking mechanism.

The movement of the structural parts to the device 96 arranged above the oscillating bar conveyor 51 is accomplished by using a lifting table 97 corresponding in its construction to the lifting table 64 of the grinding device 62, which lifting table 64 is discussed in greater detail above. The lifting table 97 has receiving means 98 thereon.

The structural parts which are manufactured in this manner are then transferred by the oscillating bar conveyor 51 to a transporting container 99.

To create a structural part having a necked section and a main section with a larger inside diameter, the structural part 13' is wound according to FIG. 8. That is, the opposite end sections 13A have a small diameter and the center main section 13B has a larger inside diameter. The mandrel 72' consists correspondingly of two end sections having a small diameter and a center main section with a larger outside diameter.

The structural part 13' is, following a hardening in the furnace 35, fed to the working station 62. The working station has according to FIG. 8 a cutting disk 100, so that when the structural part 13' rotates same is cut at the point 101, the structural part 13' being rotably supported by a work spindle 102 on one end and an axially movable clamping spindle 103 on the other end.

Then, as is illustrated in dashed lines in FIG. 8, the mandrel 72' with the remaining structural part between cutting point 101 and the gripping mechanism 67, is removed from the structural part by the gripping mechanism of the mandrel extracting device 66. The structural part 13' is held in place on the cutting point 101 by a stop (not illustrated).

All transporting mechanisms of the system, thus winding mandrel clamping device 8, 9 of the winding machine 5, the transfer device 15, the furnace transporting mechanism 14, the winding mandrel clamping device 30, 31 the oscillating bar conveyor, the bar 60, the winding mandrel extracting device 66, the lifting cylinder 73, the winding mandrel return transport device 74, the transfer device 88, including the bar 89 and the lifting cylinders 64, 69, 67, etc. run synchronously and have the same stroke.

FIGS. 9A and B illustrate the timing diagram for the system. The system sequences thereby as follows:

(1) Winding operation of the winding machine (5);
(2) the frame 18 is pivoted to engage the structural parts 13, 13' and 13" in the winding machine 5, the winding mandrels 72 of which are clamped into each of the work/ clamping spindle pairs 8 and 9;
(3) the locks 23 of the frame 18 are closed;
(4) the clamping spindles 9 of the winding machine 5 are opened;
(5) the frame 18 and the structural parts 12, 13' and 13" which are locked thereto are pivoted out of the winding machine 5;
(6) the carriage 17 is moved along the carriage support 16 to a position in front of the furnace transporting mechanism 14;
(7) the carriage 93 is moved with winding mandrels 72, which have been transferred thereto from the winding mandrel return-transport device 74, in the gripping mechanisms 94 and 95 along the carriage support 16 to a position in front of the winding machine 5 and the gripping mechanism 94 and 95 are pivoted into the winding machine 5;
(8) the winding mandrels 72 are clamped by the clamping spindles 9 in the winding machine 5;
(9) the locks of the gripping devices 94 and 95 are opened;
(10) the gripping mechanisms 94 and 95 are pivoted out of the winding machine 5;
(11) the carriage 93 is moved along the carriage support 16 to a position in front of the winding mandrel return transport device 74;
(12) the gripping mechanisms 94 and 95 are pivoted into the position which is illustrated in FIG. 1 for receiving the winding mandrels 72 which are to be transferred thereto from the winding mandrel return transport device 74;
(13) the gripping mechanisms 94 and 95 are locked after receiving the winding mandrels 72 thereon;
(14) the frame 18 with the structural parts 13, 13' and 13" is pivoted into the position illustrated in FIG. 3 in front of the furnace transporting mechanism 14;
(15) the frame 18 is moved from the position illustrated in FIG. 3 toward the conveyor chains 24 and 25 and thus the winding mandrels 72 of the structural parts 13, 13' and 13" are placed into the receiving means 26 and 27;
(16) the lock 23 of the frame 18 is opened;
(17) the conveyor chains 24 and 25 of the chain conveyor of the furnace transporting mechanism 14 are moved an increment in order to lift the mandrels 72 with the structural parts 13, 13' and 13" out of the frame 18;
(18) the frame 18 is moved back into the position illustrated in FIG. 3;
(19) the frame 18 is pivoted out of the position which is illustrated in FIG. 3 into the angular position which is illustrated in FIG. 2;
(20) the carriage 17 is moved back to the winding machine 5;
(21) indexing of the bar 60 and indexing of the oscillating bar conveyor 51;
(22) lifting the winding mandrels 72 of the structural parts 13 with the lifting table 64, clamping the winding mandrel 72 into the finish-working device (for example grinding machine 62);
(23) finish-working in the finish-working device;
(24) releasing the winding mandrels 72;
(25) winding mandrel return transport device 74;
(26) lifting the winding mandrels 72 with the structural parts 13 with the lifting table 69 and extracting the winding mandrels 72 from the structural parts 13 with the winding mandrel extracting device 66; and
(27) transporting the winding mandrels 72 with the gripping device from the extracting device 66 to the winding mandrel return transport device 74.

As can be seen from FIGS. 9A and 9B, the time interval in sequence 23 is one-third of the time interval of $t_o$ in sequence 1, since the three winding mandrels 13, 13' and 13" are wound simultaneously with the winding machine 5.

A separate connected control unit $S_1$, $S_2$ and $S_3$, $S_4$, $S_5$ and $S_6$ is associated with the winding machine 5, the transfer device 15, the furnace transporting mechanism 14, the oscillating bar conveyor 51, the winding mandrel extracting device 66 and the winding mandrel return transport device 74.

The control units $S_1$ to $S_6$ are serially connected and are linked together through signal exchange. Namely the control unit S transmits to the control unit $S_{n+1}$ the signal indicating that the operation in the device, with which the control unit $S_n$ is associated, has been concluded. Thus, the structural part 13 or the mandrel 72 is ready to be picked up, pursuant to which the control unit $S_{n+1}$ transmits to the control unit $S_n$ a feedback signal, namely that the device, with which the control units $S_{n+1}$ is associated, has picked up the structural part 13 or the mandrel 72.

The advantage of this control lies in particular in its simplicity and, in case of breakdowns in the operation of one of these devices manufacturing can be continued by making the relevant in temediate products which can be stored temporarly.

Although particluar preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A system for the manufacture of tubular structural parts of a fiber-reinforced plastic, comprising a first device with which fiber strands are soaked with a heat-hardenable binding agent, said first device having means by which at least one winding mandrel is clamped into a winding machine, on which winding mandrel the soaked fiber strands are placed, said winding machine having a guiding mechanism for the fiber strand which is to be wound up, which guiding mechanism can be moved back and forth in a direction parallel with respect to the mandrel, a transporting mechanism for moving the wound structural parts through a hardening furnace to a second device for extracting the winding mandrels from the hardened structural parts and to at least one finish-working station, means for effecting a return of the empty winding mandrels through a mandrel-preparing station to the winding station, said finish-working station being provided between the hardening furnace and the mandrel extracting device, means defining a work spindle and a clamping spindle for rotatably supporting said wound structural parts in said finish-working station, said wound structural parts being connected to and extending between said clamping spindle and said work spindle, and tool means in said finish-working station for working an exterior surface of said wound structural parts, said second device for extracting said mandrels including a gripping mechanism which engages one end of said winding mandrel and which can be moved back and forth in longitudinal direction of said winding mandrel, and a stop for engaging said hardened structural part during extraction of said winding mandrel by said gripping mechanism, said transporting mechanism which effects the transport of said wound structural parts through said hardening furnace being provided with a two-strand, step driven chain conveyor and a still further means for effecting a rotation of said structural parts, said still further means consisting of a drive spindle supported on one of said conveyor chains and an axially movable clamping spindle supported opposite the drive spindle on the other of said conveyor chains, said drive spindle and said clamping spindle each being arranged on a receiving means, said drive spindle being driven by a pinion which is coaxial with respect to said spindle axis and is arranged on the outside of a respective conveyor chain, said pinion mating with a further chain which extends parallel with respect to said conveyor chains.

2. The system according to claim 1, wherein the wound structural parts are fed to the finish-working station and the mandrel extracting device by said transporting mechanism, said transporting mechanism having positioning means thereon.

3. The system according to claim 2, wherein said transporting mechanism is constructed in two strands for receiving the structural parts thereon and extending therebetween, and wherein said positioning means are formed by lifting tables arranged between the two strands of the tranporting mechanism.

4. The system according to claim 1, wherein said tool means in said finish-working station is formed by a device for grinding the outer peripheral surface of the structural parts.

5. The system according to claim 1, wherein said tool means in said finish-working station is formed by a cutting or milling device.

6. The system according to claim 2, wherein said stop has a downwardly open recess having a width which is greater than the diameter of said winding mandrel and smaller than the diameter of said hardened structural part, said stop being arranged with respect to said structural part which is supplied by said positioning means such that the end of a winding mandrel projecting from said structural part and around which there is no winding is received in the recess and projects from the opposite side of said stop to enable a gripping thereof by said gripping mechanism.

7. The system according to claim 6, wherein said gripping mechanism has a chuck.

8. The system according to claim 1, wherein a further finish-working device is provided following said second device for milling of recesses into said structural part.

9. The system according to claim 1, wherein each winding mandrel can be clamped into the winding machine between a work spindle and an axially movable clamping spindle.

10. The system according to claim 1, wherein a third device is provided for the transfer of the wound structural parts from the winding machine to a mechanism for effecting said transport of the structural parts through said hardening furnace, said third device having for each structural part a further gripping device.

11. The system according to claim 10, wherein said further gripping device is arranged on a carriage.

12. The system according to claim 1, wherein oppositely lying receiving means are provided on the two conveyor chains of said chain conveyor, and the distances between the receiving means correspond with the distance through which said chain conveyor travels per step.

13. The system according to claim 1, wherein each clamping spindle is urged toward the associated drive spindle and at the point at which said wound structural parts are moved by a transfer device to said receiving means of said chain conveyor, wherein there is provided a moving device for moving the clamping spindle against its load to effect a clamping.

14. The system according to claim 1, wherein the chain conveyor includes sprocket pairs around which is looped the conveyor chain, said sprockets being supported in a frame which is movable relative to the other sprockets of the sprocket pairs in direction of the axes of rotation of the sprocket pairs.

15. The system according to claim 1, wherein a carriage can be moved on a carriage support extending from a position opposing the fiber strand guiding divice to said transporting mechanism which is arranged on a side of said carriage support which is opposite the side on which is located said winding machine.

16. The system according to claim 15, wherein the gripping device with the wound structural part can be pivoted about a horizontal axis from a side facing the winding machine to a side of the carriage support remote from the winding machine, and is adapted to place the wound structural parts in the transporting receiving means of the mechanism which effects the transport of the wound structural parts through the hardening furnace.

17. The system according to claim l, wherein an oscillating bar conveyor is oriented following the chain conveyor for effecting the transport of the wound structural parts through the hardening furnace.

18. The system according to claim 17, wherein the oscillating bar conveyor has two stationary bars positioned laterally outside of two parallel and movable bars.

19. The system according to claim 18, wherein the stationary bars and the movable bars each have receiving means thereon for the hardened structural parts, and the distance between the receiving means in conveying direction corresponds with the increment of forward movement of the movable bars per conveying stroke.

20. The system according to claim 17, wherein for effecting the transfer of the hardened structural parts from the chain conveyor to the oscillating bar conveyor there is provided a bar which lifts the structural parts out of the receiving means of the chain conveyor and places same in the adjacent receiving means of the stationary bar of the oscillating bar conveyor.

21. The system according to claim 20, wherein the bar is operated by a contact which is arranged on the chain conveyor directly at the point at which the bar lifts the structural parts out of the receiving means of the chain conveyor, and the contact becomes effective through structural part contact.

22. The system according to claim 1, wherein at the point at which the structural parts are removed from the receiving means of the chain conveyor, there is provided a further device for effecting the release of the structural parts and moves the clamping spindle against its load.

23. The system according to claim 1, wherein the means for effecting the return transport of the winding mandrels to the winding machine includes a two-strand, step driven chain conveyor.

24. The system according to claim 23, wherein the conveyor chains of the chain conveyor have receiving means for the winding mandrels, and the distances between the receiving means correspond in transporting direction with the distance which the chain conveyor moves per step.

25. The system according to claim 1, wherein a gripping device is provided which grips the winding mandrels which are removed by the winding mandrel extracting device from the structural parts and moves them to the chain conveyor for the return transport of the winding mandrels.

26. The system according to claim 1, wherein a device for effecting the transfer of the winding mandrels from the winding mandrel return-transport device to the winding machine is provided, which device includes a bar which lifts the winding mandrels out of the receiving means of the conveyor chains of the chain conveyor.

27. The system according to claim 26, wherein the device for effecting the transfer of the winding mandrels from the winding mandrel transport device to the winding machine includes a gripping mechanism which grips around the winding mandrels which are lifted out by the bar.

28. The system according to claim 27, wherein the gripping mechanisms are arranged on a carriage.

29. The system according to claim 28, wherein the carriage can be moved on a carriage support, which extends from the bar to the side of the winding machine remote from the thread-guiding device, and the bar is arranged on the side of the carriage support which lies opposite the winding machine.

30. The system according to claim 27, wherein the gripping mechanism can be pivoted with the winding mandrel thereon about a horizontal axis from the side which faces the bar to the side of the carriage support which faces the winding machine and is adapted for positioning of the winding mandrel between the work spindle and the clamping spindle of the winding machine.

31. The system according to claim 1, wherein one control unit is associated with each of the winding machine, the transfer device, the furnace transporting mechanism, the oscillator bar conveyor, the winding mandrel extracting device and the winding mandrel return transport device, and the control units are connected to one another serially through signal exchange.

* * * * *

UNITED STATES PATENT AND TRADEMARK OFFICE
CERTIFICATE OF CORRECTION

PATENT NO. : 4 671 842

DATED : June 9, 1987

INVENTOR(S) : Wolfgang Prochaska et al

It is certified that error appears in the above-identified patent and that said Letters Patent is hereby corrected as shown below:

Column 12, lines 14 to 18; please cancel and replace with the following:

2. The system according to Claim 1, wherein said hardened structural parts are fed to said finish-working station and said second device by said transporting mechanism, said transporting mechanism having a positioning means thereon.

Column 13, line 22; delete "transporting"

Column 13, line 23; after "the" (first occurrence) insert ---transporting---

Signed and Sealed this

Twenty-second Day of March, 1988

Attest:

DONALD J. QUIGG

*Attesting Officer*       *Commissioner of Patents and Trademarks*